United States Patent [19]

Summers et al.

[11] Patent Number: 5,889,750
[45] Date of Patent: *Mar. 30, 1999

[54] SYSTEM FOR ADJUSTING THE SPOT SIZE IN AN OPTICAL RECORDING SYSTEM

[75] Inventors: G. Clayton Summers, Foot Hill Ranch; Alan Hamersley, Orange, both of Calif.

[73] Assignee: Cinram Inc., Anaheim, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 967,294

[22] Filed: Nov. 7, 1997

Related U.S. Application Data

[63] Continuation of Ser. No. 657,776, May 31, 1996, abandoned.

[51] Int. Cl.$^6$ .................................................. G11B 7/00
[52] U.S. Cl. ........................................ 369/112; 369/44.11
[58] Field of Search ................................. 369/116, 112, 369/44.11, 44.14, 44.25, 44.23, 44.24, 44.32, 44.41; 250/201.5

[56] References Cited

U.S. PATENT DOCUMENTS

| | | | |
|---|---|---|---|
| 4,272,651 | 6/1981 | Yoshida et al. ...................... | 369/112 |
| 4,965,785 | 10/1990 | Tadokoro et al. ...................... | 369/112 |
| 4,998,234 | 3/1991 | Rees et al. . | |
| 5,046,061 | 9/1991 | Chaya et al. ........................... | 369/112 |
| 5,101,392 | 3/1992 | Yoshimaru et al. . | |
| 5,103,439 | 4/1992 | Bierhoff et al. . | |
| 5,164,932 | 11/1992 | Fennema et al. . | |
| 5,172,369 | 12/1992 | Chikuma et al. ...................... | 369/112 |
| 5,233,585 | 8/1993 | Dente et al. . | |
| 5,282,184 | 1/1994 | Takikita . | |
| 5,365,504 | 11/1994 | Noguchi .............................. | 369/44.41 |
| 5,367,513 | 11/1994 | Bates et al. . | |
| 5,425,013 | 6/1995 | Fennema et al. . | |

Primary Examiner—Muhammad N. Edun
Attorney, Agent, or Firm—Brinks Hofer Gilson & Lione

[57] ABSTRACT

A system for adjusting the spot size of an optical recording system includes a variable magnification lens assembly for adjusting the beam size while obtaining feedback of the actual beam size through an image device. The variable magnification lens assembly includes a beam expander with manual or motor-driven actuators for positioning a beam sizing lens while viewing an image of the spot. An acousto-optic modulator may be combined with the spot sizing function to reduce the number of lenses. The image device may include a charge coupled device camera connected to an image viewer or to a computer having image processing software. An operator may adjust the spot size while viewing an image of the spot, or the computer may control the beam size motors according to the measurement of the spot size.

27 Claims, 4 Drawing Sheets

SYSTEM FOR ADJUSTING THE SPOT SIZE IN AN OPTICAL RECORDING SYSTEM

This application is a continuation of application Ser. No. 08/657,776, filed May 31, 1996, now abandoned.

FIELD OF THE INVENTION

This invention relates generally to optical storage devices and more particularly to systems for spot size adjustment in optical recording systems.

BACKGROUND OF THE INVENTION

The ongoing development of optical storage devices having greater storage capacity has resulted in an evolution of new optical formats. New optical formats are often required in order to exploit advances in the physical capabilities of the devices.

On a data level, optical formats are defined by the data format used and the software used to interpret the format. On a physical level, optical formats are defined by the physical capacity of the storage medium, such as the size of the elements of information on the medium as well as the size of the spot formed by the light source used to scan the elements of information.

When improvements are made to allow for a higher density medium, entirely new formats may be required even if the concept of the operation of the device remains the same. As a result, a recording system for two different optical formats may differ from each other on a physical level in only the size of the spot used to record the information.

Demand for high capacity optical storage systems has stimulated commercialization of new advances in optical formats to the extent that new formats are on the market before the old ones have become obsolete. The standard compact disc (CD) format was one of the first optical formats for storage devices. While the CD continues to be viable in the market, the CD-R and other high density formats are also available.

Optical recording systems used to manufacture optical storage devices are similar regardless of the optical format used. The increased density of information is often made possible by using smaller recording spot sizes. On the data level, the ability to implement different algorithms in the same hardware makes it possible for different optical formats to be supported using a basic recording system. But, because each optical format may have a different recording spot size, the need for optical recording systems to implement the different optical formats creates difficulties on the physical level.

One approach of the prior art is to stop production and change the hardware in the system that sets the recording spot size. This may involve changing lenses or replacing beam blocks having different aperture sizes. This approach, however, slows the recording process because the process must be halted for the substitution and calibration of the hardware required by the new spot size.

Because the technology of optical storage devices continues to progress, and because master optical recording systems are often required to support several different optical formats, a method of quickly and easily changing recording spot sizes is desirable.

SUMMARY OF THE INVENTION

In view of the above, it is one object of the present invention to provide a system for adjusting the spot size of an optical recording system using a beam size adjuster. A beam size actuator controls the beam size adjuster to enable an operator to achieve a desired spot size.

It is a further object of the present invention to provide a closed-loop optical recording system to enable spot size adjustment without user intervention. The beam size adjuster is controlled by respective motors. An image device captures an image of the cross-section of the recording beam. Image processing software measures the size of the spot and compares the measurement with a selected reference spot size. A motor interface controls the motors for the beam size adjuster to make the spot larger or smaller depending on the difference between the actual spot and the reference spot size.

It is a further object of the present invention to provide a method for adjusting the spot size of an optical recording system by selecting a spot size and adjusting the beam size to equal the spot size. The beam size is adjusted by measuring the current beam size, comparing the actual size to the selected spot size and controlling a beam size adjuster.

It is a further object of the present invention to integrate an acousto-optic modulator with a three lens spot sizing system to combine with either an automated image processing apparatus to provide a closed-loop system, or with a manual imaging apparatus to provide an open loop spot sizing system.

DETAILED DESCRIPTION OF THE PRESENTLY PREFERRED EMBODIMENTS

Preferred embodiments of the present invention will be described by reference to the drawings where like numbers refer to like parts throughout.

Figure 1:
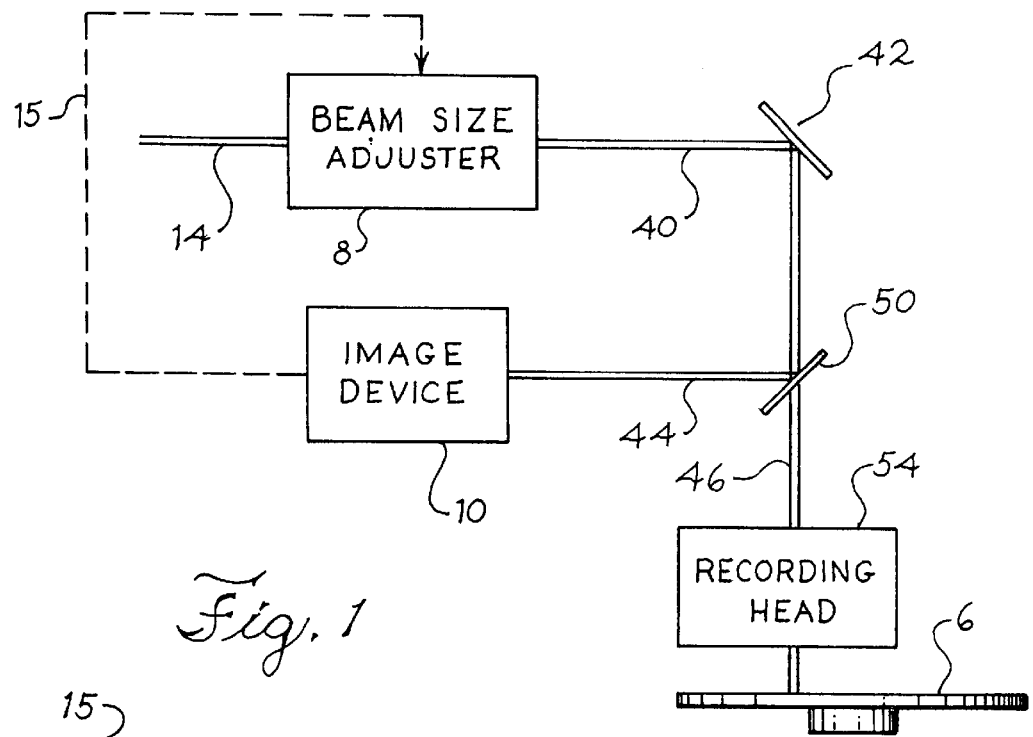
FIG. 1 is a block diagram of an example of an optical spot size adjustment system of the present invention.

FIG. 1 illustrates an embodiment of the present invention in block diagram form. The system of FIG. 1 includes a beam size adjuster 8, a beam splitter 50, an image device 10 and a recording head 54.

A light beam 14 in FIG. 1 radiates from a laser source and may enter the beam size adjuster 8 modulated with information, or it may be modulated at a later time in a manner similar to the alternative preferred embodiments described below. The size of the light beam 14 is set to a selected size using the beam size adjuster 8 according to alternative embodiments of the present invention as described below. The beam exits the beam size adjuster 8 as a sized beam 40 having a selected beam size diameter.

Depending on a chosen layout of the components of the system, the sized beam 40 may be directed by one or more mirrors 42 to a beam splitter 50. The beam splitter 50 divides the beam 40 into a measuring beam 44 that is directed to an image device 10 and a recording beam 46 that is directed to a recording head 54. In a preferred embodiment, the beam splitter 50 divides the beam such that the recording beam 46 is equal in size to the measuring beam 44.

The recording beam 46 is used to record information on the recording medium 6 by burning holes into a heat sensitive or photo sensitive material layered on the recording medium 6 in a pattern determined by amplitude modulation of the light beam 14. The recording of the information may also entail exposure to light sensitive material such as photo resist.

In an embodiment that implements a highly precise beam size adjuster 8, the beam splitter 50 and the image device 10 may be omitted from the system of FIG. 1. Alternatively, the image device 10 may be added to respond to the measuring beam 44 by measuring the size of the spot, or cross-section of the beam 44. The image device 10 calculates spot size in a manner similar to alternative embodiments as described below. The image device 10 provides a feedback path 15 to the beam size adjuster 8 to enable adjustment of the spot size according to the results of the measurement taken at the image device 10. The feedback path 15 may be automated, or it may be manual, requiring operator intervention to adjust the beam size adjuster 8 to achieve the selected spot size.

Figure 2:
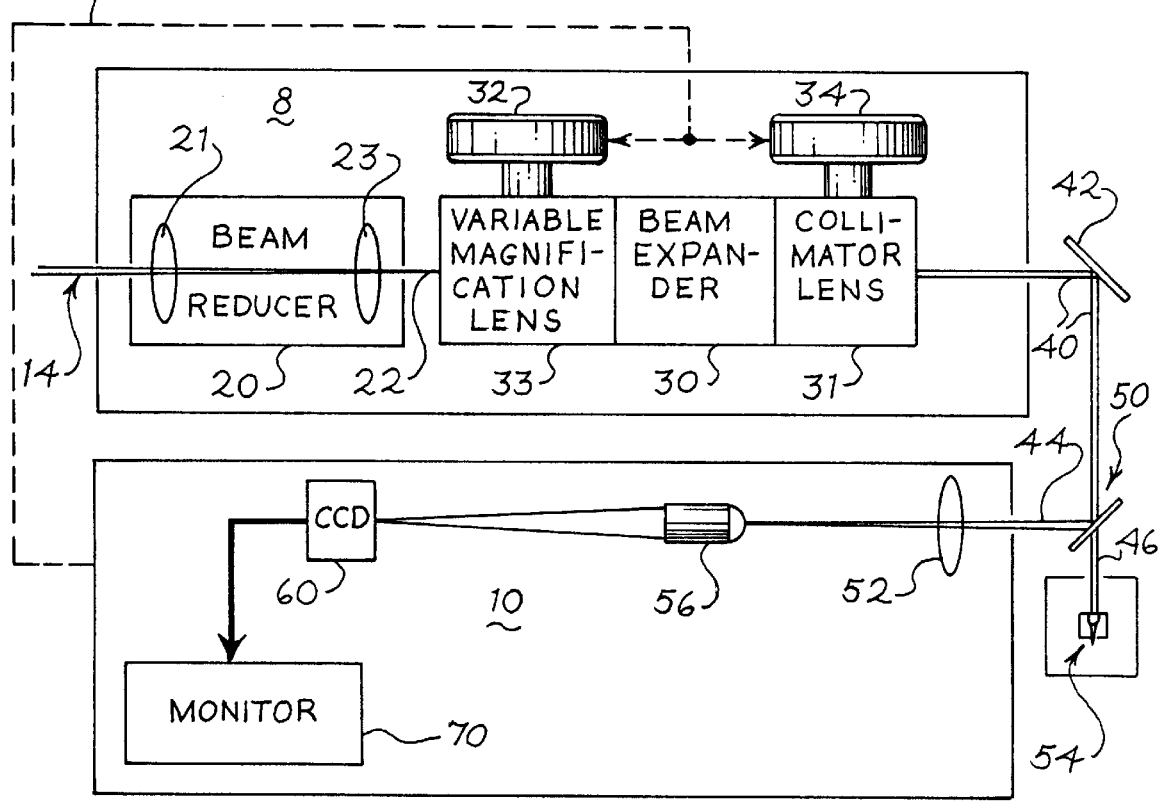
FIG. 2 is a block diagram of a manual spot size adjustment system.

FIG. 2 illustrates a preferred embodiment of the present invention using a manual feedback path 15 as described with respect to FIG. 1. In the system in FIG. 2, the beam size adjuster 8 comprises a beam reducer 20 and a beam expander 30. The light beam 14 is directed to the beam reducer 20. The beam reducer 20 comprises a focus lens 21 and a first collimating lens 23 which combine to reduce the size of the beam 14 from an original diameter to a fixed smaller diameter at 22.

In a preferred embodiment, the beam 14 is reduced to obtain a useful range of spot sizes. The light beam 14 has an original diameter of 1.0 mm and the beam expander 30 emits a beam, with a beam size that is 2 to 8 times the diameter of the beam it receives. Because the range of spot diameters of concern is 1.0 to 4.0 mm, the original 1.0 mm beam is reduced to 0.5 mm at 22 so that the entire range of the beam expander 30 is usable.

The beam expander 30 of a preferred embodiment comprises a variable magnification lens assembly 33 and a collimator lens assembly 31. The variable magnification lens assembly 33 is controlled manually by an operator using a beam size actuator 32. The collimator lens 31 is controlled manually by an operator using a collimator actuator 34. Beam expanders 30, such as a Model 56-30-2-84 manufactured by Special Optics, Inc., may be used to achieve the beam expansion required in the embodiment of FIG. 2 in which a 1.0 mm beam is expanded to 1.0 mm to 4.0 mm.

The beam size adjuster 8 in FIG. 2 is configured for an original beam diameter of 1.0 mm and for the spot size range of 1.0 to 4.0 mm. One of skill in the art can appreciate variations that do not depart from the scope of the invention. One example of a variation is the omission of the beam reducer 20. If a beam expander 30 having a magnification range of 1 to 4 times is chosen, no beam reducer 20 is needed to use the entire 1.0 mm to 4.0 mm range of interest.

The sized beam 40 has a beam diameter dependent upon the position of the lenses in the variable magnification lens assembly 33 which is controlled by the setting of the beam size actuator 32. In a preferred embodiment, a beam size actuator 32 may be indexed according to specific beam sizes. An operator positions the beam size actuator 32 according to the index of the desired beam size. The actual beam size may then be fine tuned, if necessary to achieve the proper size and collimation.

The collimator lens assembly 31 is used to ensure that the light rays that form the light beam 14 are parallel. A beam that is not well collimated has light rays that stray beyond the circumference set by the spot size. The spot will actually appear larger than its set size. A collimator lens assembly 31 may be omitted if the variable magnification lens assembly 33 produces an adequately collimated beam. In a preferred embodiment, a beam is adequately collimated if the gaussian profile of the spot indicates that there is a sufficient intensity within the desired diameter. When the variable magnification lens assembly 31 is set to emit a specific beam size, collimation is achieved when the collimator lens assembly 33 is adjusted to achieve an image of the spot having a minimum spot size.

The sized beam 40 is directed to a beam splitter 50 which passes the recording beam 46 through to a recording head 54. The beam splitter 50 also directs a measuring beam 44 to the image device 10 to obtain a precise measurement of the beam size.

The image device 10 of FIG. 2 includes an objective lens 52, a microscope objective 56, a CCD camera 60 and a monitor 70. The objective lens 52 images the measuring beam 44 onto the microscope objective 56. The objective lens 52, the microscope objective 56 and the CCD camera 60 constitute a telescope that is aligned so that an object at infinity is focused on the CCD camera 60. Because the objective lens 52 magnification and the microscope objective 56 magnification are known, the CCD camera 60 can provide an image to the monitor 70 that correlates with the actual size of the measuring beam 44. If the telescope composed of the objective lens 52, the microscope objective 56 and the CCD camera 60 is not aligned to focus an object on the CCD camera at infinity, the correlation between the image size and the actual size is upset.

The CCD camera 60 captures an image of the spot formed by the cross-section of the light beam along the optical axis. An operator may view the image captured by the CCD camera 60 using an image viewer such as the monitor 70. An image translator, such as an image digitizer may be used to translate the image of the spot to an electronic representation in the CCD camera 60 which may then be directed to a monitor 70 for viewing the image. An image frame grabber may also be used to store images of a spot at instances of time.

In an alternative embodiment, the image device 10 may be implemented with a system of lenses that projects the spot into a form viewable by a human through an eyepiece.

Using the manual mode system of FIG. 2, an operator may adjust the beam size using the beam size actuator 32 and view the results on the monitor 70. Once an approximate spot size is achieved, the operator may ensure that the beam is properly collimated by adjusting the collimation actuator 34 until the beam spot image on the video monitor 70 is at its minimum spot size. In this manner, the operator provides the feedback path 15 for accurately setting the beam size and the collimation.

It can be readily appreciated by one of ordinary skill in the art that variations in the system of FIG. 2 may be made without departing from the scope of the invention. Examples of some, but by no means all, such variations are discussed with reference to FIG. 3.

Figure 3:
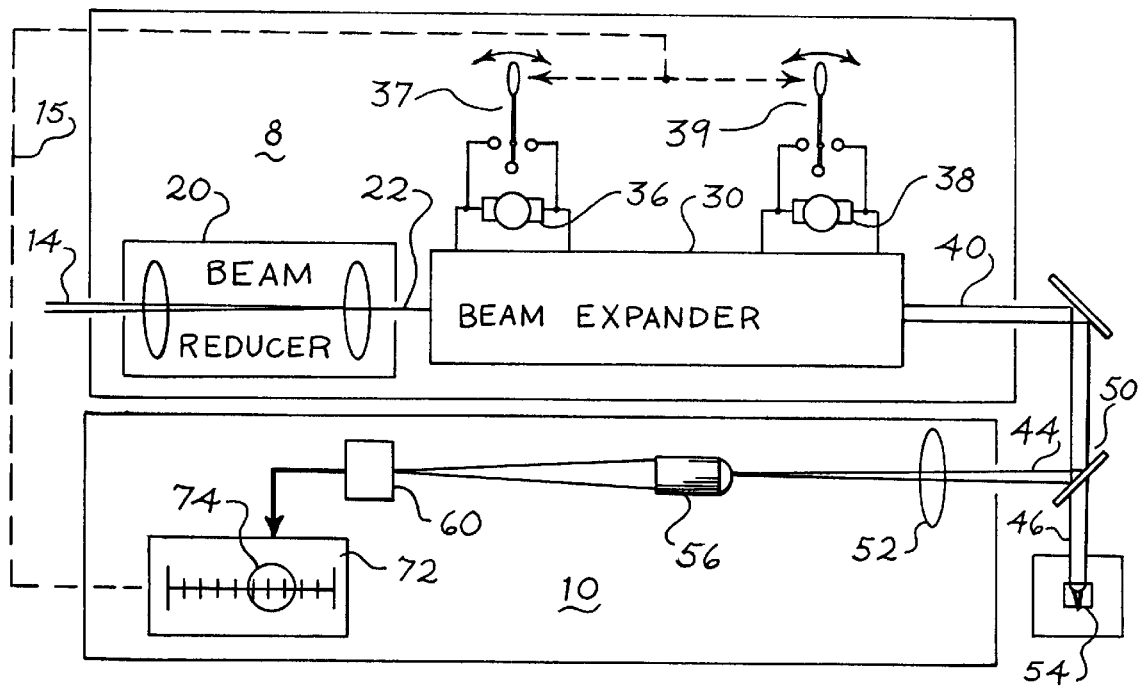
FIG. 3 is a block diagram of a manual spot size adjustment system comprising examples of alternative components.

One variation illustrated in FIG. 3 concerns the actuators used for the beam size actuator 32 and the collimation actuator 34. The beam expander 30 of FIG. 2 is a manually operated beam expander 30 having manually controlled actuators 32, 34 for adjusting beam size and collimation. The manual actuators 32, 34 may be replaced by a motor system similar to motors used on the zoom systems of cameras. In FIG. 3, the beam size actuator includes a beam size motor 36 which may be turned on or off using a beam size motor switch 37. In the example of FIG. 3, the beam size motor switch 37 allows the user to move the beam sizing lenses to make the spot larger by pressing the switch in one direction, and to make the spot smaller by pressing the switch in the opposite direction. The collimation actuator includes a collimation motor 38 activated by a collimation motor switch 39.

The system in FIG. 3 also illustrates a variation for the manner in which the image in the CCD camera 60 may be viewed. The image viewer 72 of FIG. 3 includes a reticle 74 that is preferably scaled in a manner that makes it easy for an operator to measure the image of the spot visually.

Figure 4:
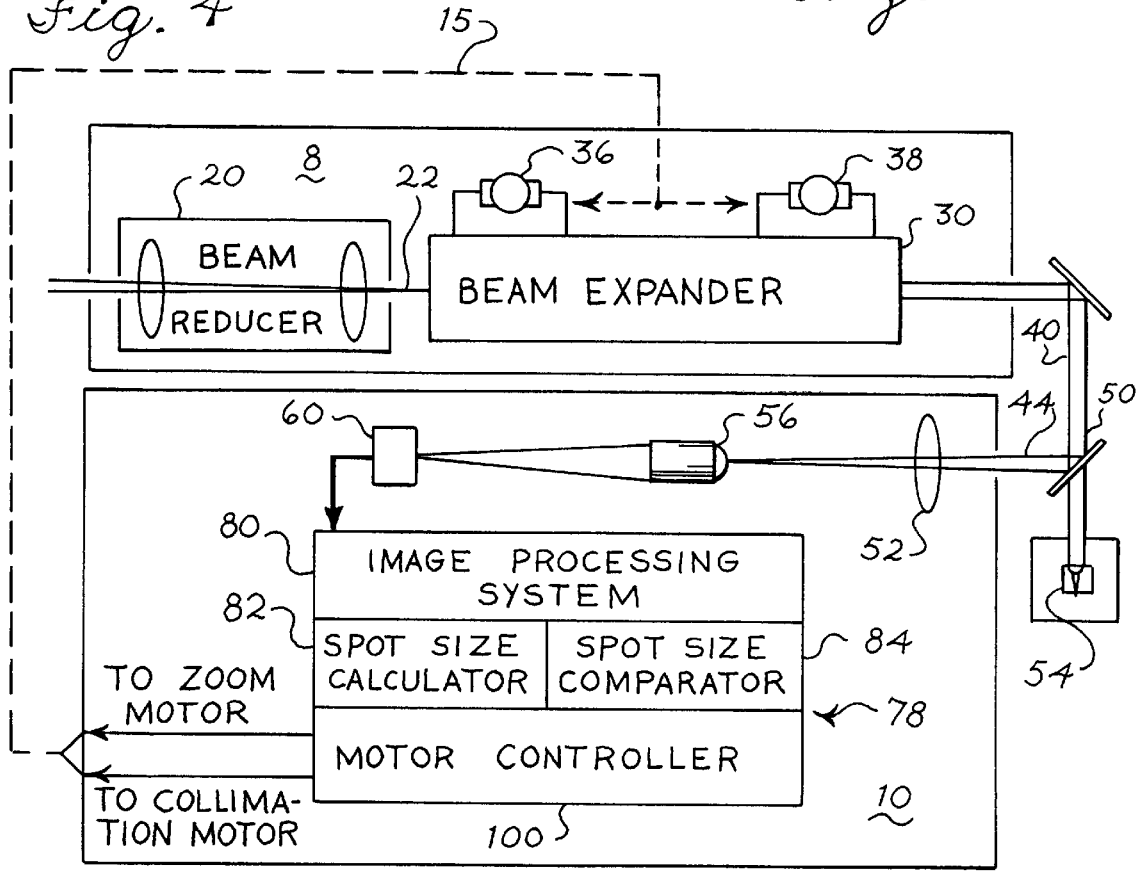
FIG. 4 is a block diagram of an automated spot size adjustment system.

In an alternative preferred embodiment of the present invention, the process of adjusting the spot size may be completely automated. The spot size adjustment system of FIG. 4 illustrates an example of an automatic spot size adjustment system. The system of FIG. 4 comprises a beam reducer 20, a motor controlled-beam expander 30, a beam splitter 50, a recording head 54, an objective lens 52, a microscope objective 56, a CCD camera 60, an image processing system 80 and a motor controller system 100.

The system of FIG. 4 is a closed loop system allowing for automated operation. The feedback path 15 in FIG. 4 operates without human intervention. In the system of FIG. 4, the CCD camera 60 is coupled to a computer 78 that has an image processing system 80 and a motor controller system 100.

The CCD camera 60 of a preferred embodiment outputs a digital representation of the image of a spot formed by the measuring beam 44. The digital representation of the cross-section of the measuring beam 44 is preferably in a format amenable for processing by image processing software that is part of the image processing system 80. Image processing systems comprising image frame grabbers and image processing software are readily available. An example of a frame grabber and software is the Meteor frame grabber and the Imaging Library manufactured by Matrox, Inc.

Alternatively, software may be designed to translate any image format to a format that is ready for processing by image processing software.

The image processing system 80 processes the image of the beam spot as substantially a circle and a spot size calculator 82 measures the spot size by calculating the diameter of the circle formed by the beam spot. The image processing system 80 may also accept a reference spot size in terms of a diameter, so that a spot size comparator 84 may compare the actual size of the spot with a selected reference spot size.

The software in the image processing system 80 may then communicate any discrepancy between the actual spot size and reference size to the motor controller system 100 that controls the zoom motor 36 and the collimation motor 38.

With the automated system of FIG. 4, an operator enters the reference spot size into the computer 78 having the image processing system 80, and then waits until the zoom motor 36 and the collimation motor 38 position the zoom and collimation lenses 31, 33 to provide a well collimated and precisely sized beam 44. The feedback path 15 in the system of FIG. 4 is provided by the control of the motors 36, 38 by the motor controller 100 in the computer 78.

Figure 5:
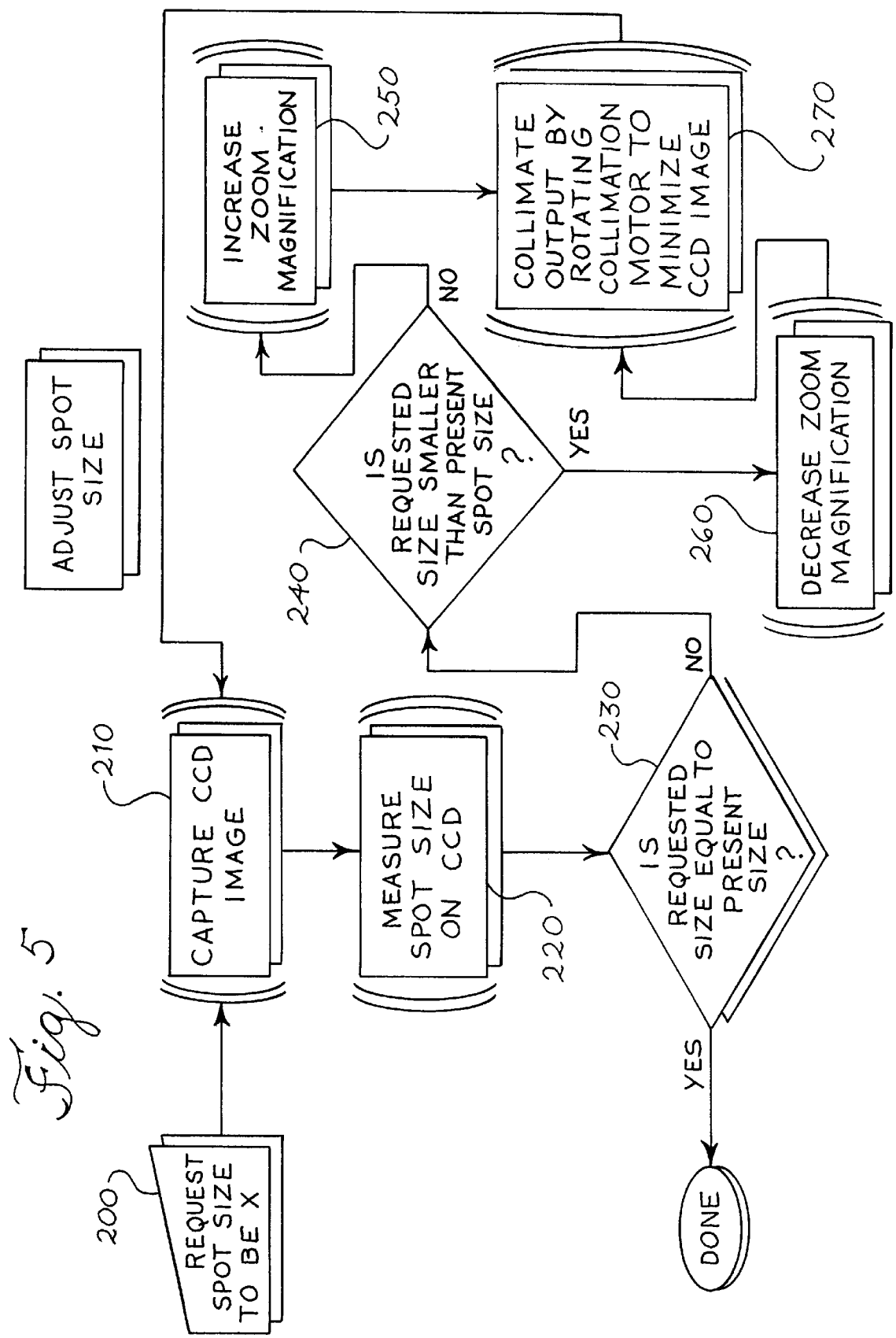
FIG. 5 is a flow chart for an automated method for adjusting the spot size of an optical recording system.

FIG. 5 illustrates a flowchart that implements an automated method for adjusting the size of an optical recording spot. An apparatus similar to the system described in FIG. 4 may be used to execute the flowchart in FIG. 5.

Processing in FIG. 5 begins when an operator requests a spot size to be X as shown in block 200. An image is captured by the CCD camera at block 210 in preparation for the measurement of the present spot size. The process in step 210 may be carried out by a frame grabber that stores the digital representation of the image of the spot of the CCD camera 60 in a buffer. The digital data is recognized by the image processing software as a spot which may be measured by its diameter. The spot size is measured as shown in 220 by the spot size calculator 82.

The measurement of the spot size on the CCD is compared at 230 with the spot size requested by the spot size comparator 84. If the spot size requested is equal to the spot size measured, processing is concluded. If the spot sizes are different, the comparison is checked to determine if the requested size is smaller than the measured size as shown in block 240. If the requested size is smaller, magnification is decreased as shown in 260. If the requested size is larger, magnification is increased as shown at 250.

The process of varying the magnification at step 250 may involve approximation whereby the motor controller 100 calculates how much to move the beam size motor 36 to set the magnification to the point at which the spot size is equal to the reference spot size. Alternatively, the motor may change the magnification in small increments each time step 250 is reached until the desired spot size is attained.

After adjustment of the magnification is completed, the collimation is adjusted until the present image on the CCD is at a minimum size as shown in 270. The minimum spot size is found by successively capturing images, measuring each spot image and driving the collimation motor 38 in response to the difference between the latest spot size and the previous spots sizes. When the minimum size is found, control returns to 210 where the process is started from the beginning. The process continues until the requested spot size is equal to the measured spot size as determined in block 230. When a well collimated beam at the desired spot size is achieved, the process of recording information continues.

Figure 6:
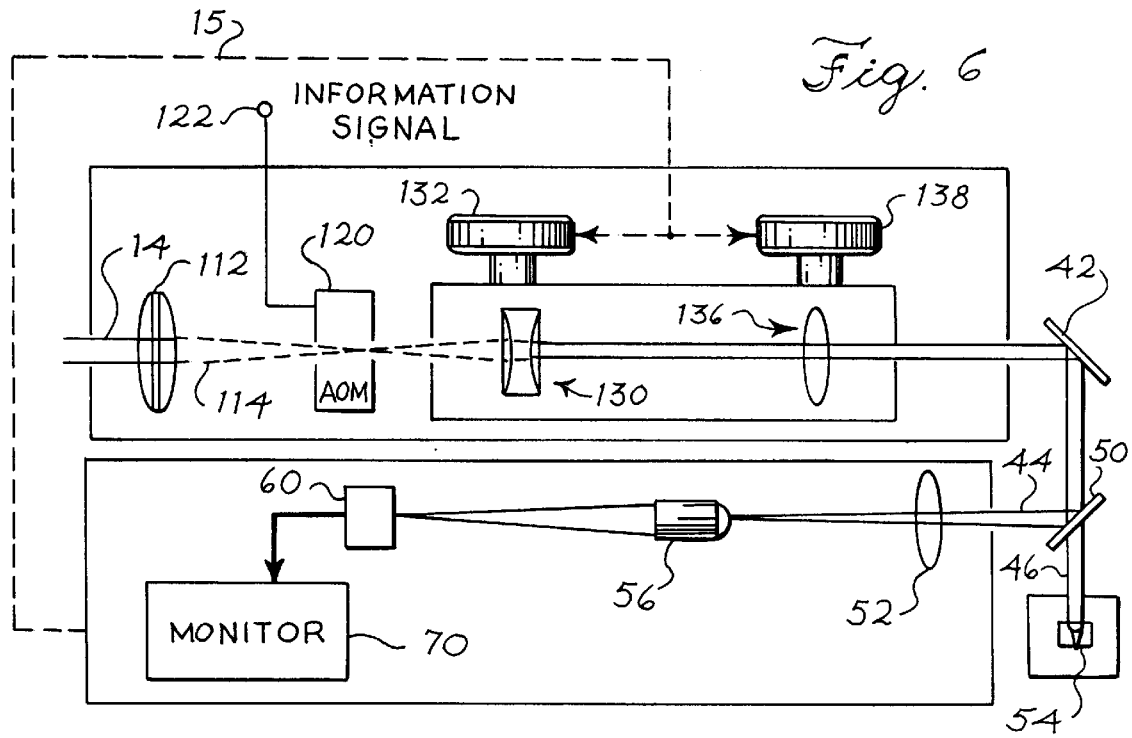
FIG. 6 is a block diagram of a manual spot size adjustment system incorporating an acousto-optic modulator.
Figure 7:
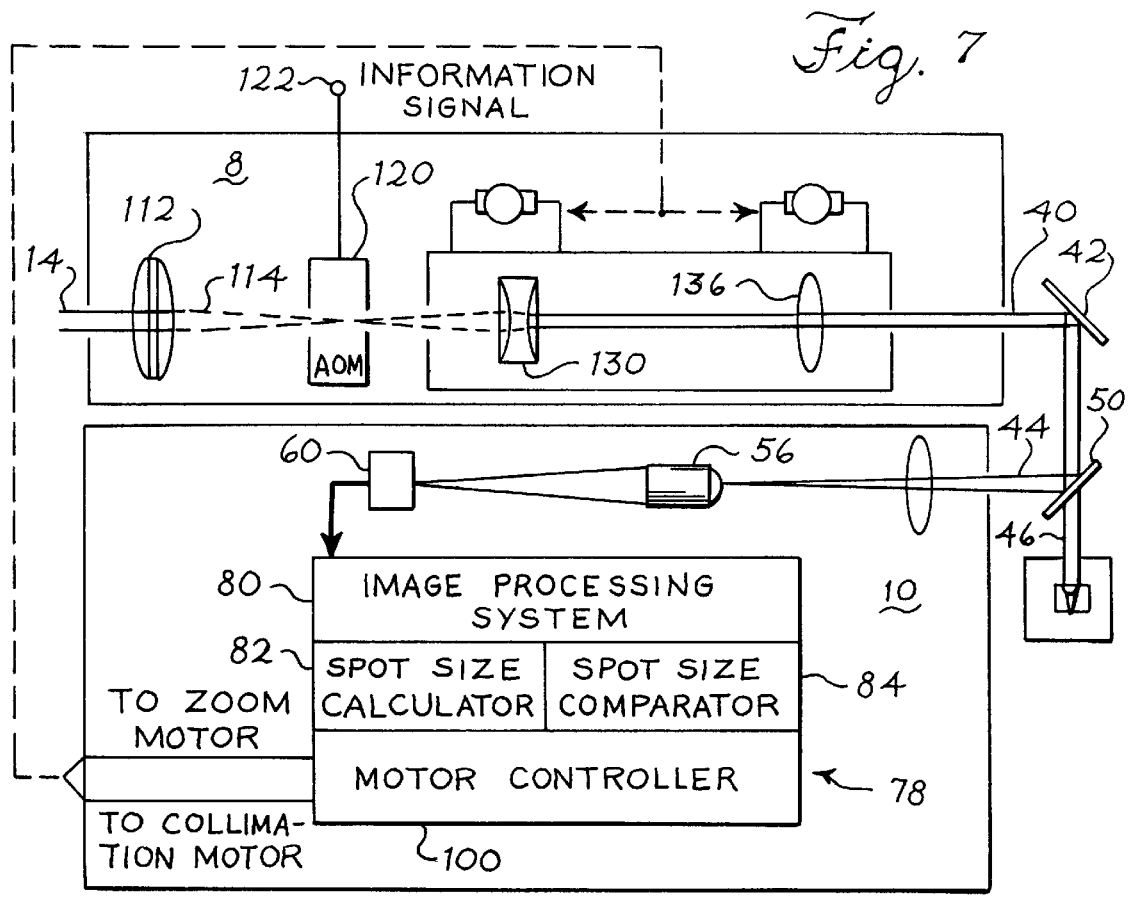
FIG. 7 is a block diagram of an automated spot size adjustment system incorporating an acousto-optic modulator.

Another alternative embodiment of the present invention is illustrated in FIG. 6. The embodiment in FIG. 6 combines the modulating function with the spot sizing function. The combination of functions results in a reduction of the number of lenses needed to carry out the spot sizing function. In the preferred embodiments described with respect to FIGS. 2 through 4, two lenses are used in the beam reducer 20 and five lenses are used in the beam expander 30. In the system of FIG. 6 described below, the number of lenses in the spot sizing function is reduced to three.

In the system of FIG. 6, the light beam 14 is input into the system in an unmodulated state. The beam 14 passes through an imaging lens 112 that images the light beam 14 onto an acousto-optic modulator 120. The acousto-optic modulator 120 receives an information signal 122 to create an acoustic wave pattern using piezoelectric material present in the optical medium containing the light beam. The acoustic wave created by the piezoelectric material generates a refractive index wave that behaves like a sinusoidal grating.

In a preferred embodiment, the behavior of the acousto-optic modulator 120 is such that the laser beam is shuttered on and off by the digital nature of the information signal 122. In order to ensure a sufficiently rapid rise time in the intensity of the beam signal, the imaging lens 112 images the beam to a point in the chamber of the acousto-optic modulator 120.

The signal output by the acousto-optic modulator 120 is directed to a beam sizing lens 130 to set the size of the light beam. The light beam is then directed to a collimator lens 136. An operator may control the position of both the sizing lens 130 and the collimator lens 136 using the collimator and sizing actuators 132, 138. The specifications of the lenses chosen for beam sizing at 130 and beam collimation at 136 is dependent on the desired range of spot sizes and the distance available between the two lenses.

The beam emitted by the collimating and sizing lenses is a sized beam 40. It may be directed to a mirror 42 which further directs the sized beam 40 to a beam splitter 50. The beam splitter 50 divides the sized beam 40 into the recording beam 46 directed to the objective lens at the recording head 54, and the measuring beam 44 directed to the image device 10. The image device 10 in FIG. 5 comprises the imaging lens 52, the microscope objective 56, the CCD camera 60 and the monitor 70.

An embodiment utilizing an acousto-optic modulator 120 may be automated as shown in FIG. 6 to operate in a manner similar to the embodiment described in FIG. 4. The process described with respect to the flowchart in FIG. 5 may be implemented by the embodiment illustrated in FIG. 6.

Alternative embodiments have been described for carrying out the present invention. It is to be understood that one of ordinary skill in the art may appreciate further variations without departing from the scope of the invention.

For example, the beam size adjuster has been described as operating using beam expander 30 having a variable magnification lens assembly 33 and a collimating lens assembly 31. In one variation, the beam size adjuster 8 reduces a light beam 14 diameter. In another variation, a collimating lens assembly 31 is omitted. In another variation, the beam size adjuster 8 uses stops to size the beam rather than lenses, although lenses are preferred in an optical recording system because the gaussian profile is better preserved with lenses than with stops.

In further variation in the image device 10, the image of the spot may be measured by a video waveform monitor. A waveform having a known intensity may provide the scale with which to measure the spot diameter.

Similar variations can be appreciated in other parts of the present invention by one of ordinary skill in the art.

We claim:

1. In an optical recording system, a system for adjusting the size of an optical recording spot comprising:

a beam size adjuster comprising a beam reducer and a beam expander, the beam size adjuster disposed to receive a light beam and to emit a collimated, sized beam directed toward a recording head, the size of the sized beam responsive to a position of a moveable lens; and an actuator operative to adjust the position of the moveable lens over a range of positions, each position corresponding to one of a range of spot sizes.

2. The adjusting system of claim 1 further comprising an image device disposed to capture an image of a cross-section of the sized beam.

3. The system of claim 2 wherein the image device further comprises:

an image translator operative to convert an image of the sized beam to an electronic representation of the image of the sized beam; and an image viewer operative to display the electronic representation of the image of the sized beam.

4. The system of claim 2 wherein the image device comprises a charge coupled device camera.

5. The system of claim 2 wherein the image device further comprises:

an image viewer operative to present the cross-section of the sized beam; and a reticle on the image viewer.

6. The adjusting system of claim 2 wherein the beam size adjuster comprises:

a first motor operative to adjust the beam size adjuster;

wherein the image device further comprises:

an image translator operative to convert an image of the sized beam to an electronic representation of the image of the sized beam; and an image processor responsive to the electronic representation of the image of the sized beam, said image processor comprising a spot size calculator operative to determine an actual beam size, and a spot comparator operative to determine a difference between the actual beam size and a selected spot size; and wherein the actuator comprises:

a first controller operative to control the first motor in response to the difference determined by the spot comparator.

7. The system of claim 6 wherein the image device comprises a charge coupled device camera.

8. The system of claim 6 further comprising a monitor connected to the charge coupled device camera.

9. The system of claim 6 further comprising:

a collimator;

a second motor operative to position the collimator; and a second controller operative to drive the second motor until the actual spot size is at a minimum.

10. The system of claim 9 further comprising a beam splitter disposed to receive the sized beam from the beam size adjuster and to divide the sized beam into a first beam portion directed to a recording media and a second beam portion directed to the image device.

11. The adjusting system of claim 9 further comprising:

an acousto-optic modulator disposed to receive a light beam and to emit a modulated light beam.

12. The system of claim 2 further comprising a beam splitter disposed to receive the sized beam from the beam size adjuster and to divide the sized beam into a first beam portion directed to a recording media and a second beam portion directed to the image device.

13. The adjusting system of claim 1 wherein the beam size adjuster comprises:

a variable magnification lens assembly responsive to an operator-controlled size adjuster actuator; and a collimator lens assembly responsive to adjustment by an operator-controlled collimator actuator.

14. The system of claim 13 wherein the collimator actuator comprises a collimator motor responsive to a second operator-controlled switch.

15. The system of claim 1 wherein the actuator comprises a beam size motor responsive to a first operator-controlled switch.

16. The adjusting system of claim 1 further comprising:

an acousto-optic modulator disposed to receive a light beam and to emit a modulated light beam.

17. The system of claim 1 wherein each spot of the range of spot sizes is associated with a same spot shape throughout the range.

18. The system of claim 1 further comprising at least one objective lens positioned to receive the collimated beam.

19. A method for adjusting a recording spot size in an optical recording system comprising the steps of:
   passing a light beam through a first lens assembly comprising a beam reducer and a beam expander;
   sizing the beam in response to a position of a moveable lens in the lens assembly;
   emitting a collimated sized beam from the first lens assembly;
   passing the sized beam toward a recording head; and
   setting a first actuator operatively connected to the moveable lens to a position corresponding to a selected spot size, each position corresponding to one of a range of spot sizes.

20. The method of claim 19 further comprising the steps of:
   forming an image of a spot formed by the light beam using an imaging device; and
   adjusting the first actuator on the lens assembly to cause the image of the spot to attain a selected spot size.

21. The method of claim 20 further comprising the steps of:
   splitting the light beam into a first portion directed to a recording medium and a second portion directed to the imaging device.

22. The method of claim 19 further comprising the step of recording on a recording medium using a part of the light beam.

23. The method of claim 19 further comprising the steps of:
   passing the light beam through a second lens assembly having a second actuator; and
   adjusting the second actuator until the image of the spot is at a minimum size.

24. The method of claim 19 wherein the step of setting the actuator comprises the steps of:
   passing a portion of the light beam to an image device;
   forming an image of a spot formed by the light beam;
   measuring the image of the spot; and
   automatically driving a lens motor to position at least one lens in the lens assembly until the measured image of the spot is substantially the same size as a selected spot size.

25. The method of claim 24 further comprising the step of:
   collimating the light beam by a method comprising the steps of:
      directing the light beam through a collimating lens in the lens assembly; and
      driving a motor that positions the collimating lens until the image of the spot is at a minimum size.

26. The method of claim 19 wherein each spot of the range of spot sizes is associated with a same spot shape throughout the range.

27. The method of claim 19 further comprising receiving the collimated beam with an objective lens.

* * * * *

UNITED STATES PATENT AND TRADEMARK OFFICE
CERTIFICATE OF CORRECTION

PATENT NO. : 5,889,750
DATED : March 30, 1999
INVENTOR(S) : Summers, et. al.

It is certified that error appears in the above-identified patent and that said Letters Patent is hereby corrected as shown below:

```
Column 8, line 41, delete "claim 9", insert --claim 1--.
Column 8, line 61, delete "claim 1", insert --claim 6--.
Column 9, line 9, after "collimated" insert --,--.
```

Signed and Sealed this

Seventh Day of March, 2000

Attest:

Attesting Officer

Q. TODD DICKINSON

Commissioner of Patents and Trademarks